(12) United States Patent
Sheehan et al.

(10) Patent No.: US 8,769,106 B2
(45) Date of Patent: Jul. 1, 2014

(54) UNIVERSAL CONFIGURABLE DEVICE GATEWAY

(76) Inventors: Thomas Sheehan, Soperton, GA (US); Jay Hartley, San Ramon, CA (US); Stephen Clementi, Oconomowoc, WI (US); David M. Nowak, Chicago, IL (US)

(*) Notice: Subject to any disclaimer, the term of this patent is extended or adjusted under 35 U.S.C. 154(b) by 713 days.

(21) Appl. No.: 11/194,114

(22) Filed: Jul. 29, 2005

(65) Prior Publication Data

US 2006/0067209 A1    Mar. 30, 2006

Related U.S. Application Data

(60) Provisional application No. 60/592,869, filed on Jul. 29, 2004.

(51) Int. Cl.
| | | |
|---|---|---|
| *G06F 15/16* | (2006.01) | |
| *H04L 29/08* | (2006.01) | |
| *H04L 12/46* | (2006.01) | |
| *H04L 12/66* | (2006.01) | |
| *H04L 12/24* | (2006.01) | |
| *H04L 29/06* | (2006.01) | |

(52) U.S. Cl.
CPC ...... *H04L 29/08846* (2013.01); *H04L 12/4625* (2013.01); *H04L 12/66* (2013.01); *H04L 41/0213* (2013.01); *H04L 41/0253* (2013.01); *H04L 41/046* (2013.01); *H04L 41/22* (2013.01); *H04L 67/125* (2013.01); *H04L 67/28* (2013.01); *H04L 67/2823* (2013.01); *H04L 69/08* (2013.01); *H04L 69/18* (2013.01); *G05B 2219/25217* (2013.01)
USPC ........... 709/227; 709/220; 709/221; 709/223; 700/11; 700/19; 710/305

(58) Field of Classification Search
USPC ............... 709/228, 227, 223; 399/8; 370/216
See application file for complete search history.

(56) References Cited

U.S. PATENT DOCUMENTS

| | | | |
|---|---|---|---|
| 6,389,464 B1 * | 5/2002 | Krishnamurthy et al. | .... 709/220 |
| 6,963,925 B1 | 11/2005 | Ishikawa et al. | |
| 2001/0049721 A1 | 12/2001 | Blair et al. | |
| 2002/0087622 A1 | 7/2002 | Anderson | |
| 2002/0103898 A1 | 8/2002 | Moyer et al. | |
| 2003/0065721 A1 | 4/2003 | Roskind | |
| 2003/0118353 A1 * | 6/2003 | Baller et al. | ...................... 399/8 |
| 2003/0135566 A1 | 7/2003 | Nishiguchi et al. | |
| 2004/0071148 A1 | 4/2004 | Ozaki et al. | |
| 2004/0153594 A1 * | 8/2004 | Rotvold et al. | ............... 710/305 |
| 2004/0208188 A1 | 10/2004 | Kimura et al. | |
| 2005/0102406 A1 * | 5/2005 | Moon | .......................... 709/228 |
| 2005/0228509 A1 * | 10/2005 | James | ............................ 700/19 |
| 2006/0168275 A1 | 7/2006 | Lin et al. | |
| 2009/0187782 A1 | 7/2009 | Greene | |
| 2009/0228726 A1 | 9/2009 | Malik | |

FOREIGN PATENT DOCUMENTS

WO     2006015245     2/2006

* cited by examiner

*Primary Examiner* — Kyung H Shin

(57) ABSTRACT

A method and an apparatus for providing a configurable, object-oriented, protocol-neutral interface between a physical device and a server. The method includes coupling an application gateway with the physical device, where the application gateway includes a protocol gateway module configured for physical communication with the physical device, and an object adapter module configured for virtual communication between the physical device and a client application running on a server. The method further includes configuring a service starter to launch and bind the object adapter module with the protocol gateway module, configuring the protocol gateway module to define the physical interface between the physical device and the protocol gateway, and establishing communication between the protocol gateway module and the physical device, such that the physical device is exposed as a network device on the server.

10 Claims, 8 Drawing Sheets

Deployment Options

UNIVERSAL CONFIGURABLE DEVICE GATEWAY

CROSS-REFERENCES TO RELATED APPLICATIONS

This application claims priority to U.S. Provisional Patent Application No. 60/592,869, filed Jul. 29, 2004, the disclosure of which is hereby incorporated by reference herein in its entirety for all purposes.

BACKGROUND OF THE INVENTION

The present invention relates in general to physical device management and in particular to an apparatus for enabling a network-level and protocol-neutral communication with a physical device.

Networked intelligent devices are virtually everywhere today, embedded into building management systems, medical devices, home thermostats, commercial chillers, HVAC systems, and automobiles to name a few. Embedded software developers have long been aware of the engineering challenges and high costs associated with adding management capabilities to devices. A significant problem is that the technologies available in the marketplace today often are limited to a specific manufacturers' products or a specific industry, and are only appropriate for certain customer requirements. As a result, the absence of a truly flexible, standards-based and cost-effective remote management solution has encumbered device manufacturers and their consumers from realizing the benefits of the connectivity they desire.

For example, the controls industry has traditionally performed the monitoring and control functions that manage automated devices within large enterprises. Their technology, however, is severely limited and very costly to install and maintain. Using proprietary protocols and cumbersome architecture, they are unable to effectively access valuable data from the disparate and ever-growing variety of devices available today. As more devices come to market, enterprises demand new solutions to mine the intelligence of these resources and to integrate them into their increasingly complex networks. The problem facing enterprises, service providers and manufacturers alike is how to get disparate intelligent devices to speak the same language and communicate what they know throughout the enterprise.

There is, therefore, a need to efficiently establish a non-proprietary or generic communication, in an easily configurable manner, between a software-based monitoring client and a device that does not suffer from the shortcomings of existing facilities control and management systems.

BRIEF SUMMARY OF THE INVENTION

The present invention provides methods and devices for enabling generic communication between a software client and a device. A feature of the present invention is directed towards techniques that enable device virtualization and make the device virtualization available to anyone, anywhere, anytime.

In one embodiment, the present invention provides a method of providing a configurable, object-oriented, protocol-neutral interface between a physical device and a server. The method includes coupling an application gateway with the physical device, where the application gateway includes a protocol gateway module configured for physical communication with the physical device, and an object adapter module configured for virtual communication between the physical device and a client application on a server. The method further includes configuring a service starter to launch and bind the object adapter module with the protocol gateway module, configuring the protocol gateway module to define the physical interface between the physical device and the protocol gateway, and establishing communication between the protocol gateway module and the physical device, such that the physical device is exposed as a network device on the server. In one aspect, the application gateway, the protocol gateway module, and the object adapter module are implemented as software agents.

In another embodiment, the present invention provides an apparatus for connecting a physical device as a network device with a networked server. The apparatus includes a first connector for attachment of the apparatus with the physical device, a second connector for attachment of the apparatus with the server, and a communication module connected with the first and the second connectors for establishing a communication between the physical device and the server. The communication module includes a protocol gateway module configured for physical communication with the physical device, an object adapter module configured for virtual communication between the physical device and a client application on a server, a lookup service module for announcing the object adapter module to the server, and a service starter module for launching and binding the object adapter module with the protocol gateway module. The object adapter is coupled with a remotely located client, and the client may be a server, or it may be an embedded controller.

For a fuller understanding of the nature and advantages of the embodiments of the present invention, reference should be made to the following detailed description taken in conjunction with the accompanying drawings.

DETAILED DESCRIPTION OF THE INVENTION

Figure 1:
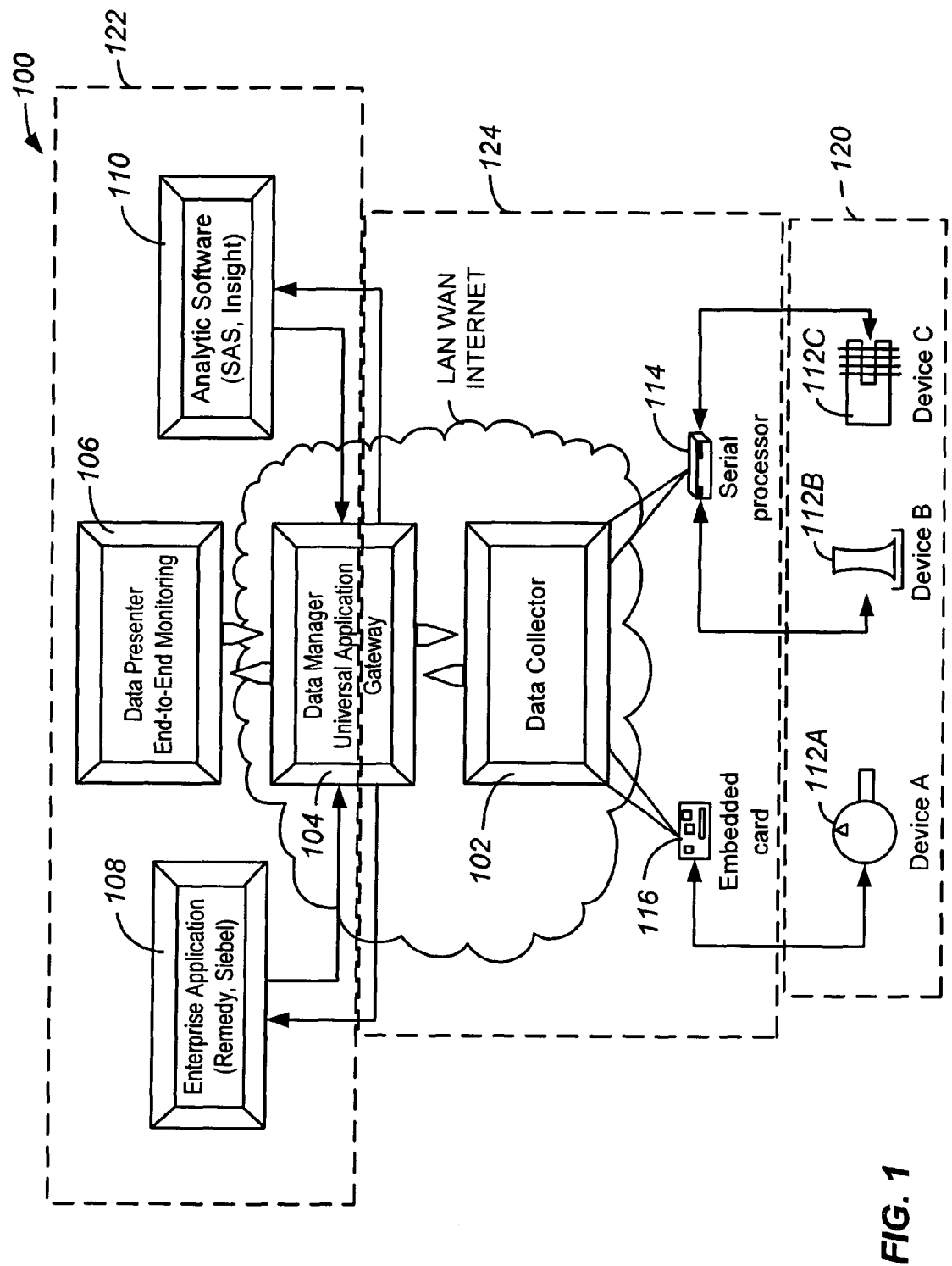
FIG. 1 is an exemplary block diagram of the device application gateway architecture in accordance with one embodiment of the present invention.

The present invention provides methods and devices for enabling generic communication between a software client and a physical device. Embodiments of a device application gateway to allow such generic communication will now be described.

The embodiments of the present invention enable a configurable communication with one or more devices through any communication network, eliminating the need for costly and time-consuming system integration. This is achieved by the application gateway, or the device application gateway. As used herein, the application gateway, and the device application gateway are synonymous. The application gateway enables a two-way communication between a physical device that is conventionally not addressable by a remote client or client application program and a remote client or client application program. Using the application gateway, data is sent in a generic form from the requesting client, and commands are received in a generic form by the object adapter, which intermediates the communication with physical device to which it is connected. In addition, it is envisaged that the above communication may occur across any communication network. The above application gateway may be implemented in software or hardware either internal or external to the physical device with which the application gateway is connected.

As used herein, the physical device with which communication and/or control is desired, may be a power distribution equipment, environmental control equipment, security monitoring equipment, health/safety and fire equipment, a power supply device, an uninterrupted power supply (UPS), a compressor, any other infrastructure device or system, a serial gateway, a head-end system, a programmable logic controller (PLC), an HMI workstation, an IT server or a management system, or any device that supports industry-accepted protocols, including ModBus, Lon, DF1, N2, BACnet, CIP and SNMP, as well as other industry-accepted protocols, but other devices might also be so controlled. Each such device is capable of generating and receiving I/O information over its vendor-defined communication interface, which might be an RS-232, RS-422, RS-485 or contact closure harnessing interface, for example. I/O information is communicated between the device and a client application or device in accordance with the device vendor's defined native language protocol.

Embodiments of the application gateway by enabling system-level communication between a software client and a physical device can provide for a generic data access and management of data from devices for management and control in many industrial applications in many industries including but not limited to building automation and industrial automation and process control. Such industrial applications include applications in the automotive, telecommunications, manufacturing, retail, health care, education, government, warehousing and distribution. In addition, application service providers, internet service providers, managed service providers, control system integrators, general contractors and original equipment manufacturers (OEMs) can also benefit greatly from the embodiments of the present invention. Many of these industrial systems include various sub-systems, such as access/intrusion monitoring, fire and smoke monitoring, HVAC systems, industrial and process control systems, lighting systems, motor control systems, refrigeration systems, and other systems where a management system communicates with a device. The device application gateway(s) can provide for a generic communication between any device and any application layer of a software client, by virtualizing the physical device such that the physical device is exposed as a networked device on a system server.

FIG. 1 is an exemplary block diagram 100 of the device application gateway architecture in accordance with one embodiment of the present invention. The architecture model depicted in FIG. 1 shows three modules, namely a data collector 102, a data manager 104 and a data presenter 106. The modules enable one or more devices 120 to communicate with one or more clients 122 via the application gateway 124. These modules can be implemented separately or in combination for maximum flexibility. The data collector 102 collects manufacturer-specific signals from the devices, such as devices 112A-C (collectively 120). The data collector evaluates the signals and transforms them into standardized data packets of actionable information. In addition, the data collector can perform basic computations to enhance and add meaning to the information. The data manager 104, by performing additional analysis and computation, optimizes the efficiency of data interpretation, transformation and transmission. The data manager 104 can present data from data collectors to external systems such as building management systems (BMS) or network management systems (NMS). The data manager 104 can also store the device data in a normalized form for subsequent analysis and reporting, for example by enterprise level applications 108, or other analytical software 110, or the data presenter 106. The data presenter 106 can dynamically present the data in a single dashboard view, making it easy for the viewer to understand and act upon the data. The device application gateway's data collector 102 is in communication with a server using an Internet Protocol (IP) packet-based communications link. The data collector 102, which collects manufacturer-specific signals and transforms them into standardized data packets of actionable information, can be configured to provide the data to any client application, which may include enterprise level applications 108, or other analytical software 110, the data manager 104 or the data presenter 106.

In one embodiment, the software architecture of the device application gateway 124 is based on the notion of a software agent. As used herein, an agent represents an element of the digital library (collection or service) to a client, and is an encapsulated piece of software that can have the following properties, namely autonomy, negotiation and mobility. An autonomous agent represents both the capabilities (ability to compute something) and the preferences over how that capability is used. Thus, agents have the ability to reason about how they use their resources. In other words, an agent does not have to fulfill every request for service, only those consistent with its preferences. A traditional computer program does not have this reasoning ability. In reference to the negotiation attribute, since the agents are autonomous, they need to negotiate with other agents to gain access to other resources or capabilities. The process of negotiation can be, but is not required to be, stateful and will often consist of a conversation sequence, where multiple messages are exchanged according to some prescribed protocol, which itself can be negotiated. A mobile agent is one that itself or parts of it can migrate from one environment (e.g., the embedded card, 116) to another environment (e.g., data collector 102) and continue execution.

Rules for controlling each device or piece of facilities equipment 120 are provided by the application gateway 124 to each physical device, when requested by a client 108. Rules for monitoring each piece of facilities equipment are programmed to, and remain resident and operational on, the application gateway. System users may dispose (or distribute) application gateways in any manner so as to promote equipment management in any geographic location, so long as the application gateway has access to a voice or data connection that supports Internet Protocol (IP) packet-based communications. System users can connect to the application gateway in order to view or manage gateway operations, individual gateways and/or their supported infrastructure equipment through a common browser application or a web-enabled spreadsheet via a voice or data connection that supports IP packet-based communications.

The application gateway architecture provides support for multi-vendor facilities architectures and is able to control supported apparatus by hosting, storing and communicating operating rules and protocols necessary to communicate with and manage any particular piece of facilities equipment. The application gateway architecture of the present invention can be implemented in a client/server configuration architecture, with the gateway responsible for direct communication with particular pieces of infrastructure equipment, in their native language protocols, so as to gather apparatus-specific monitoring information, and with the client responsible for analyzing system-variable response-metrics and adaptively provide control responses thereto. As used herein, the application gateway is the server, and the analysis tool is the client; and a system-variable response-metrics includes for example a variable indicative of the operating status of a particular piece of infrastructure equipment. Furthermore, a client, in addition to its conventional definition, refers to any device, system or process that can be a consumer of the data that is provided by the data collector. Alternatively, the client, as used herein, can be the master of the data collector. As used herein, clients may be servers, applications, embedded systems, etc. However, in all cases, they act to consume data produced by the agents as well as to control the physical devices by way of sending command messages to the agents. In addition, as used herein, the agent is embodied by the implementation of the object adapter and the protocol gateway, and there can be any number of clients for a given agent.

The application gateway may expose data from one or more devices 112A-C to a variety of enterprise applications 108, simultaneously, in standard formats recognizable to those applications. The application gateway, deployed on discreet serial processors 114 (e.g., about the size of a deck of cards) or embedded communication cards 116, can connect the intelligent device(s) 112A-C to the enterprise application 108, or other upstream applications.

Pertinent to an appreciation of the application gateway is an understanding of the forms and types of devices or facilities equipment that may be interfaced with a server embodying the application gateway. Such devices are known to be not feasibly interfaced with a server, and at best may require expensive hardware upgrades to enable their interfacing with a server. Such devices (e.g., devices 112A-C of FIG. 1) may belong to any one of categories of facilities management equipment. Various devices and communication protocols through which they receive/provide I/O are described below. These devices can be interfaced with a client software program through the application gateway.

Power supply and distribution equipment typically includes utility power monitoring equipment that measures power line state with current and voltage transducers disposed along distributed lines, utility metering equipment that measures the quantity of power used, power distribution units (PDU's) that distribute line power to a local environment, uninterruptible power supplies (UPS's) that supply instantaneous power in the event of a line interruption, generators that provide long term power in the event of a line interruption, or a local set of equipment and switch gear systems that supply and distribute power from a main transmission or reception point. These types of power facilities typically provide information as to system state over RS-232, RS-422 or RS-485 serial interfaces, CEbus busses, or in certain cases, via contact closure.

Environmental control equipment typically includes heat, vent, air conditioning and refrigeration units (HVACR), leak detection systems for detecting fluid leaks in certain buildings as well as underground storage tanks, and heating systems that supply heat to a process pipe for hotel hot water systems, chemical plants, pipelines, and the like. As was the case with power facilities equipment, environmental equipment typically provides information over RS-232, RS-422 or RS-485 serial, or CEbus interfaces, depending on the vendor. System state information is also available in contact closure form.

Health/safety/fire monitoring equipment are typically installed in panel form that monitor the status of smoke, heat, fire or distress sensors in any given facility. System state information is typically available over an RS-232 or RS-485 interface. Certain equipment manufacturers also configure their equipment to provide information over Cebus interfaces. A parallel port feed is also commonly used to develop information from health/safety/fire monitoring equipment as well as contact closure. Again, the system state information interface is dependent on the choice of vendor.

Security systems include closed contact alarm sensors, motion sensors, and the like, and may also include closed circuit video monitoring systems and web-based cameras. Sensor-based information is conventionally available over CEbus interface busses, and very commonly over RS-232, RS-422 and RS-485 serial interfaces, while video graphic information from security cameras may be processed by some form of video compression, prior to transmission, and are conventionally available as JPEG compressed video images.

Regardless of the category of facilities management equipment a particular piece of infrastructure apparatus belongs to, or which communication interface has been chosen for implementation by the vendor, each piece of infrastructure equipment is able to communicate with a physical device and/or a management server, or a client by sending system state information, in a predetermined form and format, to its serial or parallel communication interface port, and by receiving control commands, in the same predetermined form and format, from the application gateway. The meaning of each control code, and the actions to be taken by a particular piece of facilities equipment in response thereto, are defined by each individual vendor or manufacturer and are conventionally termed vendor codes. The physical form of vendor codes are not especially relevant to practice of the invention, and need not be described in detail herein. It is sufficient to mention that vendor codes may be expressed in a variety of forms including sequences of ASCII characters, vendor defined binary byte sequences, "C" codes, "C++" codes, JAVA codes, and the like, including any digital signal variant thereof.

Vendor codes provide monitoring information about, and control information to, a particular piece of equipment. Vendor control codes command a piece of equipment to take a certain required action on the basis of monitoring response variables passed by the machine to the application gateway, and thence to the management server. The combination of vendor codes directed to a particular apparatus and the system response variables returned by the apparatus are often referred to as that apparatus' native language protocol. Equipment manufacturers and vendors each typically define their own native language protocols, or adopt one of various industry standard protocols. Accordingly, in order to be able to communicate with a wide variety of equipment, some means are provided so that the system of the present invention is able to communicate with various types of infrastructure equipment in accordance with their native language protocols.

For each type of device described above, secure device management and control, as well as access to device data, is supported over existing IP networks using the application gateway. The process by which the device gateway takes data extracted from multiple disparate devices using different protocols and normalizes it into information intelligible to enterprise applications, is described in further detail below.

The application gateway offers a breakthrough in Enterprise Device Management (EDM), an emergent field within the larger sphere known as Machine-to-Machine (M2M) technology. With its innovative open-standard approach, an enabled device can be accessed over an IP network. The application gateway can expose the data in virtually any physical or infrastructure device and can thus enable the control of that device, regardless of the communication protocol it uses. The application gateway's process normalizes the device data into standard nomenclature, transforming it into meaningful and actionable information, thus enabling the sharing of this information through a wide variety of reporting mechanisms. The application gateway can also enable easy reconfiguration, as the modules that execute software routines can be easily expanded and thus enable the performance of even higher-value analytics on the data they collect. The collected data can then feed directly into a wide range of enterprise-level applications.

The device application gateway provides data management and control functionality that can run anywhere, and on any system using a small software footprint. The small footprint is a desired characteristic of control and automation systems. The application gateway can live on the device itself, on a serial gateway, on a head end system, on a PLC, an HMI workstation, or any IT server or management system, regardless of manufacturer make or model. True application-to-application communications are enabled from the physical device and then across multiple systems. This means that physical devices and the control systems living upstream can interoperate easily and take advantage of rich functionality while leveraging the standards used by modern IT systems. The application gateway in general and the data collector 102 and the data manager 104 modules provide support for devices that support ModBus, Lon, DF1, N2, BACnet, CIP, and SNMP devices, as well as other industry-accepted protocols.

Figure 2:
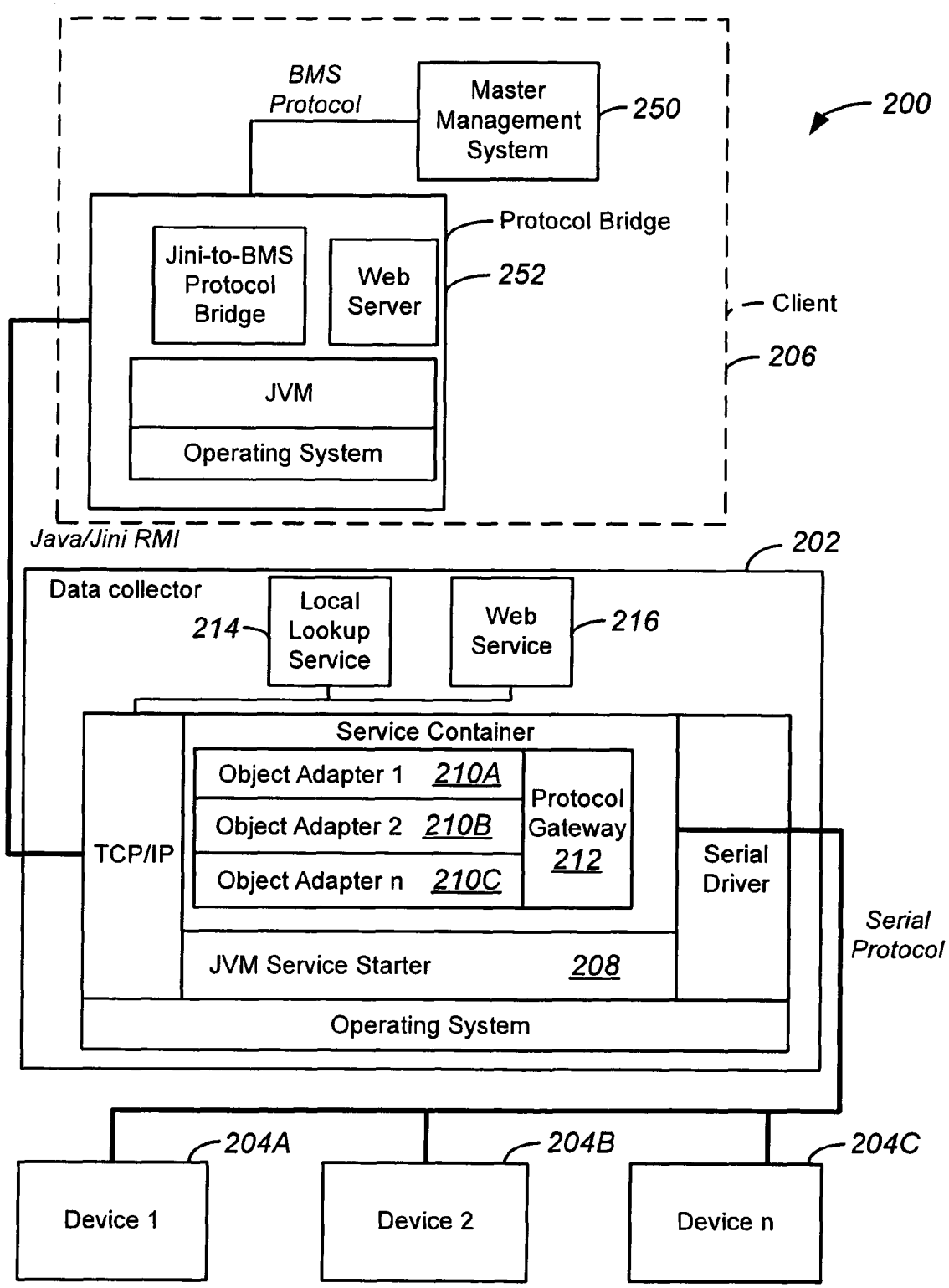
FIG. 2 is an exemplary block diagram of the software components of one embodiment of the data collector portion of the device application gateway architecture of FIG. 1.

FIG. 2 is an exemplary block diagram 200 of the software components of the data collector portion 202 of the application gateway architecture in accordance with one embodiment of the present invention. As shown in FIG. 2, various devices 204A-C are enabled to exchange their proprietary data via a serial protocol with a client application 206. The data collector 202 includes various modules, namely: a service starter 208, a protocol gateway 212, one or more object adapters 210A-C, and a look up service 214. The data collector 202 exchanges data from devices 204A-C with client applications 206 using standard IP protocols. In cases where there is a need for a user interface, the data collector 202 exchanges data from devices 204A-C with client applications 206 using standard IP protocols, via a web server 216. As is shown in FIG. 2, there exists one instance of the object adapter 210 for each physical device 204. The data collector 202 provides secure access to devices via various communication protocols, including serial protocols, such as RS-232, RS-422 and RS-485, and TCP/IP Ethernet, including wired and wireless variants thereof. The data collector also provides a configurable, object-oriented, protocol-neutral interface to devices via an attribute mapping. In one implementation, the attribute mapping is stored in one or more attribute configuration files, for example in XML format.

The attribute map serves three purposes. The first purpose is a general description of each device attribute, including but not restricted to name, short description, data type, unit of measure, and whether the attribute is read-only or allows write access. The second purpose is to map the attribute to an address that can be used by the object adapter to query the data source for the value. The format of this addressing is protocol-specific. Example addressing might be a memory address, a database entry, a ModBus register, or a BACnet object attribute. The address parameterizes the variations in data access that may occur within the protocol specification. For example, a 16-bit Modbus register may contain data for a single 16-bit value, 16 single-bit values, or half of the data for a 32-bit value. Only the register address and number of registers are required by the Modbus protocol to acquire the data, but are not sufficient to derive meaning from the data. The attribute address in the object adapter provides the information necessary to construct a query in the protocol language and decode the response into a meaningful value. This approach allows users to add support for new devices without rewriting (protocol) object adapter code. For example, new XML files are generated describing the attributes of the new device and the protocol-specific mechanism for accessing the attribute values. The third, optional, purpose of the attribute configuration is to define a calculation to be performed on the raw data in generating the attribute value. For example, a 16-bit value from the device may represent a valve position, where 4000 represents closed (0%) and 20000 represents open (100%). Applying a simple calculation, in this case a linear transformation defined by a scale factor and offset, allows the object adapter to present the device attribute in meaningful physical units rather than as an artificial computer memory value that requires further processing by client components. The descriptive information, addresses, and optional computations defined in the attribute map combine to add meaning to the collected data at the point of acquisition, making it easier for clients to use the data.

The data collector 202 of the application gateway provides direct support for integration of services into industry standard network environments. The core components are designed for use in a distributed environment, but are independent of the particular network transport mechanism. Exemplary industry standard network environments include the Java Management Extensions (JMX) Remote API, Jini, Web services, or an enterprise message bus. Each of these communication technologies enables a distributed application composed of network services that can be dynamically discovered by clients and other services. In addition, the network transport layer provides security features such as encryption and authentication. The data collector as implemented in a standard open architecture produces well-behaved, robust, fault-tolerant, secure, highly scalable services suitable for serving as the basis of enterprise management system instrumentation.

As shown in FIG. 2, the data collector 202 communicates over a standard open-architecture network, for example a message bus, with a client application 206. The open architecture network technology provides a sound basis for implementing and deploying distributed systems at a variety of scales from the very small implementations to the very large implementations. As management systems are decidedly distributed, the data collector uses the network environment as the foundation of its management systems framework. The primary benefits of this choice include: flexibility of physical distribution of system nodes; security; dynamic discovery and federation of system elements; fault tolerance; scalability; and embeddability.

The data collector's various modules, namely: the protocol gateway 212, one or more object adapters 210A-C, the service starter 208, and the look up service 214 are described below in further detail.

Protocol Gateway

The protocol gateway 212 can be the basis for communication with remote (networked) devices (or other systems) via a native protocol. The protocol gateway 212 allows for the physical equipment to be represented on the network environment even if the device does not natively provide for this capability. The protocol gateway interface defines general methods that are provided for any low-level protocol. The protocol gateway interface's methods are defined to send messages to a device synchronously; send messages to a device asynchronously; and register a receiver for asynchronous notifications. The asynchronous notifications may be responses to asynchronous requests, events generated by the protocol gateway itself, or, if supported by the protocol, unsolicited events generated by the managed device. A protocol gateway can typically implement these methods for a single protocol, for example Modbus, DF1, and so on. The protocol gateway interface can break protocol communication down to protocol request objects, with corresponding protocol responses, and protocol events that may be generated asynchronously by the end device. The specifics of the objects used depend on the protocol, so a protocol gateway client knows some details about the underlying protocol. In addition, an administrative interface can be defined for managing the protocol gateway. The administrative interface can include methods to start and stop the gateway service and to get the name and description of the protocol implemented by the gateway. In addition, the administrative interface can expose protocol-specific configuration properties or attributes, such as protocol variant, version, serial communication parameters (e.g., baud rate, data bits, stop bits), and serial hardware (e.g., RS-232, RS-485 2-wire, RS-485 4-wire). The administrative interface can also provide methods for retrieving the list of protocol-specific configuration properties, then reading and writing the values of those properties. A purpose of the protocol gateway is to expose the protocol communication in an object-oriented manner and make it available as a network service. A ModBus protocol gateway, which is one example of a specific protocol gateway, is described below.

For example, a ModBus protocol gateway interface defines common (standardized) access methods for communicating with ModBus enabled devices. The service is a specialization of the protocol gateway interface that defines a (standardized) common access method for gateways generally. The ModBus specific interface does not add functional constraints to the protocol gateway; it allows for the enterprise to communicate with ModBus devices in a standard manner. Methods for the ModBus protocol gateway are supplied to: send messages to a device synchronously; send messages to a device asynchronously; and register a receiver for asynchronous notifications. With regards to registering, the notifications are responses to asynchronously sent messages or events generated by the protocol gateway itself, since the Modbus protocol is a strict master-slave protocol that does not support unsolicited messages from the slave. The mapping of synchronous protocols (master-slave oriented, request/response oriented, etc.) to an asynchronous event model is one aspect of the device virtualization performed by the application gateway. This enables clients/consumers of information to be preemptively notified of events originating at the physical device, even if the physical device has no capability of communicating such events.

In one implementation, the base implementation of ModBus protocol gateway can be intended for use as a normal Java class (i.e., it imports the package and uses it locally). Using this implementation directly serves the needs of those writing dedicated ModBus applications that do not need a distributed network environment. The ModBus protocol gateway is also provided as a network service, in order to enable the protocol's implementation in distributed applications.

Object Adapter

The one or more object adapters 210A-C are the basic abstraction allowing application writers to communicate with specific remotely located (networked) objects without regard to the underlying native communication protocols. A protocol object adapter represents a physical device or system as a collection of named attributes. The adapters are responsible for providing a mapping of logical attribute name(s) to the particular physical implementation employed. For example, access to a device attribute named 'Output Power' looks the same whether the implementation relies on a ModBus request of a device, a call to a BACnet device, or a query against a relational database that periodically updates the state of the physical entity. The protocol object adapter interface can provide methods for retrieving descriptive information or metadata about the object's attributes, for retrieving the current values of one or more attributes by name, for setting the value of writable attributes, for establishing periodic polling of a set of attributes, and for registering asynchronous notification of events generated by the end device or the object adapter itself. The protocol object adapter interface can also define a method for releasing an attribute value. The value of a device attribute may be determined by a combination of internal sensors, settings, and/or computation. In some systems, a write command can be used to override the device's internal mechanism and fix an attribute value in order to modify the device's behavior. A later released command does not set a specific value for the attribute, but removes the override and allows the attribute value to again vary based on the device's internal logic. Not all protocols support a release command but the object adapter interface can provide access to this control command for those protocols that do support it.

Similar to the protocol gateway, the protocol object adapter can also provide an administrative interface for managing the protocol object adapter. This interface can provide methods similar to the protocol gateway for starting and stopping the service as well as querying the name and description of the implemented protocol. In addition, methods are provided that can bind the protocol object adapter to a protocol gateway, and to set a default polling period. Further details of the operation of the object adapter, its polling activity, its data acquisition activity and its control command activity are described below in conjunction with FIGS. 2A-D.

Polling is an asynchronous process in which the object adapter repeatedly sends a request for data through the protocol gateway, then calls back to the client with the latest attribute values. The values of protocol object adapter attributes are presented in a structure that includes a data value object and a time stamp (e.g., millisecond) of when the data was collected. The use of a generic object for the data value allows for standard numeric and Boolean values, as well as more unusual attribute values such as camera images. In addition, communication errors can be communicated by setting the value of the attribute as an exception object describing the error. This is superior to using arbitrary numeric values for invalid data such as the IEEE floating point standard "Not a Number" (NaN). The addition of a time stamp to the data points enables many types of data analysis, such as determining the root cause of a system failure. If the underlying device protocol does not provide the time stamp, then the object adapter assigns a time stamp based on timing information provided in the response from the protocol gateway. Various examples of specific object adapters are described below.

Figure 2A:
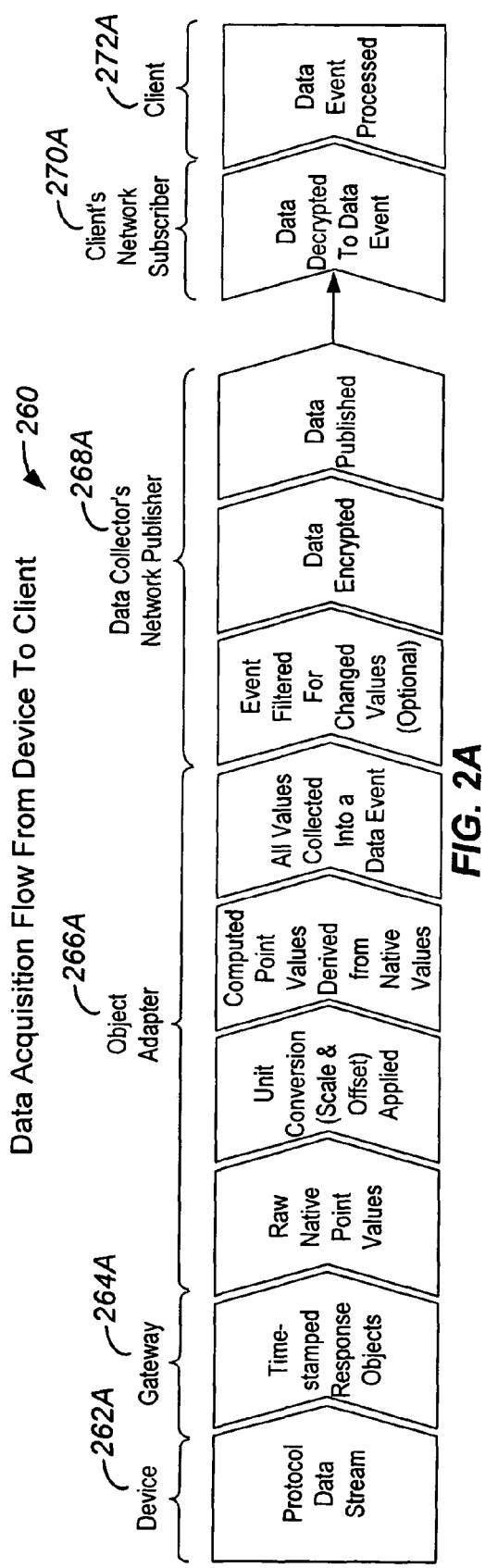
FIG. 2A is an exemplary data acquisition flow diagram showing the operations for acquiring data from a physical device by a client.

FIG. 2A is an exemplary data acquisition flow diagram 260 showing the acquisition of data from a physical device by the client. Once a client 272A has requested data from a device 262A, protocol data stream is provided to the gateway 264A, where the data objects are processed and transmitted to the object adapter 266A in the form of time-stamped response objects. In the object adapter 266A, raw native point values get converted into computed point values using unit conversion to scale and offset the raw values. The computed data point values and their time stamps are collected into a data event and forwarded on to the data collector's network publisher 268A. In the data collector's network publisher 268A, the event data may optionally be filtered for changed values, and the event data is encrypted and published. The encrypted and published data is transmitted to the network subscriber 270A that decrypts the data and sends the data to the client 272A, where the data event is processed.

Figure 2B:
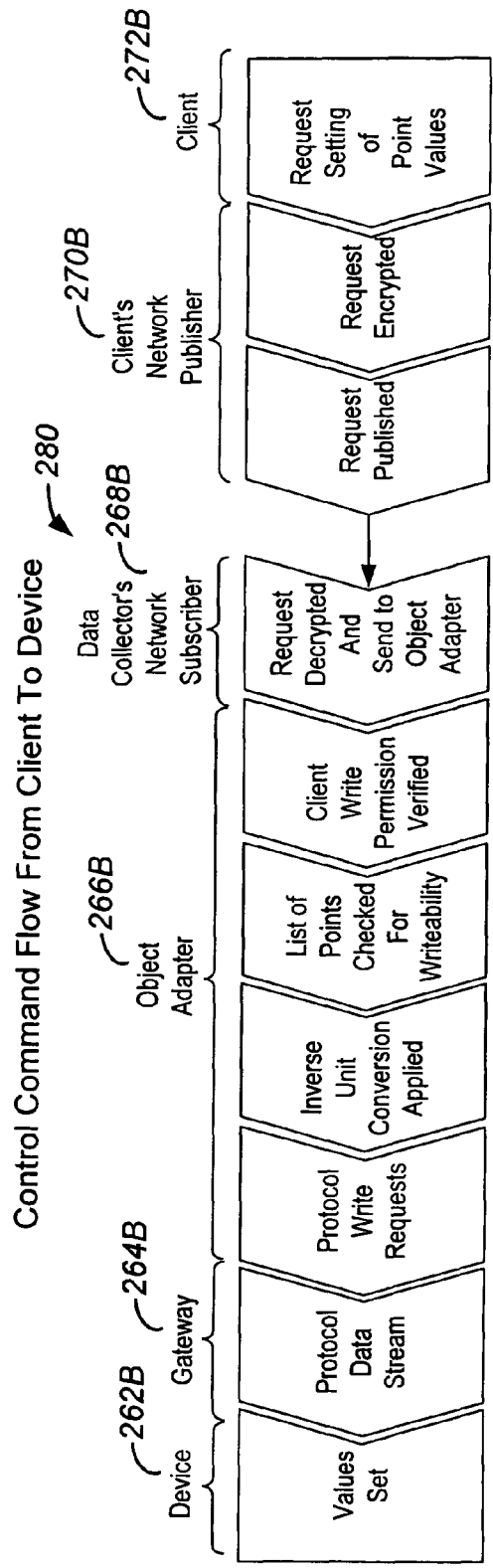
FIG. 2B is an exemplary control command flow diagram showing the operations for controlling a physical device by a client.

FIG. 2B is an exemplary control command flow diagram 280 showing the controlling of a physical device 262B by a client 272B. Once a client 272B, requests the setting of a point value (e.g., setting a valve's position) the request is sent to the client's network publisher 270B, where the request is encrypted and published. The encrypted and published request is send to the data collector's network subscriber 268B, where the requested set point data is decrypted and send to the object adapter 266B. At the object adapter, the client's write permission is verified, the set point checked for writeability, the scaled set point data is inverse converted to the native scale and a write request object is constructed and sent to the gateway 264B. The gateway 264B receives the request object, converts it to the protocol data stream and transmits it to the device 262B, where the point value is set.

Figure 2C:
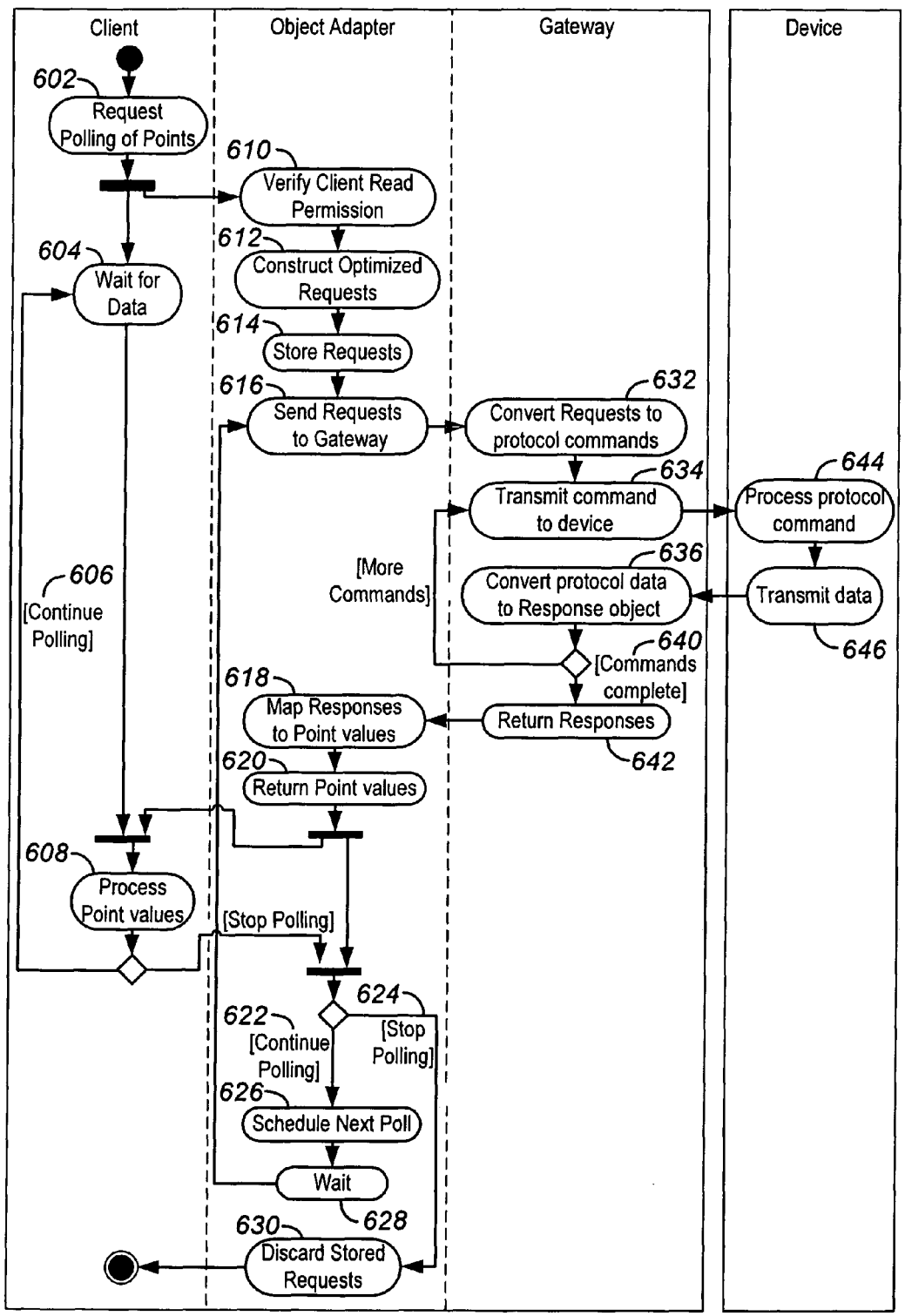
FIG. 2C is an exemplary flow chart of the poll activity of the object adapter of FIG. 2.
Figure 2D:
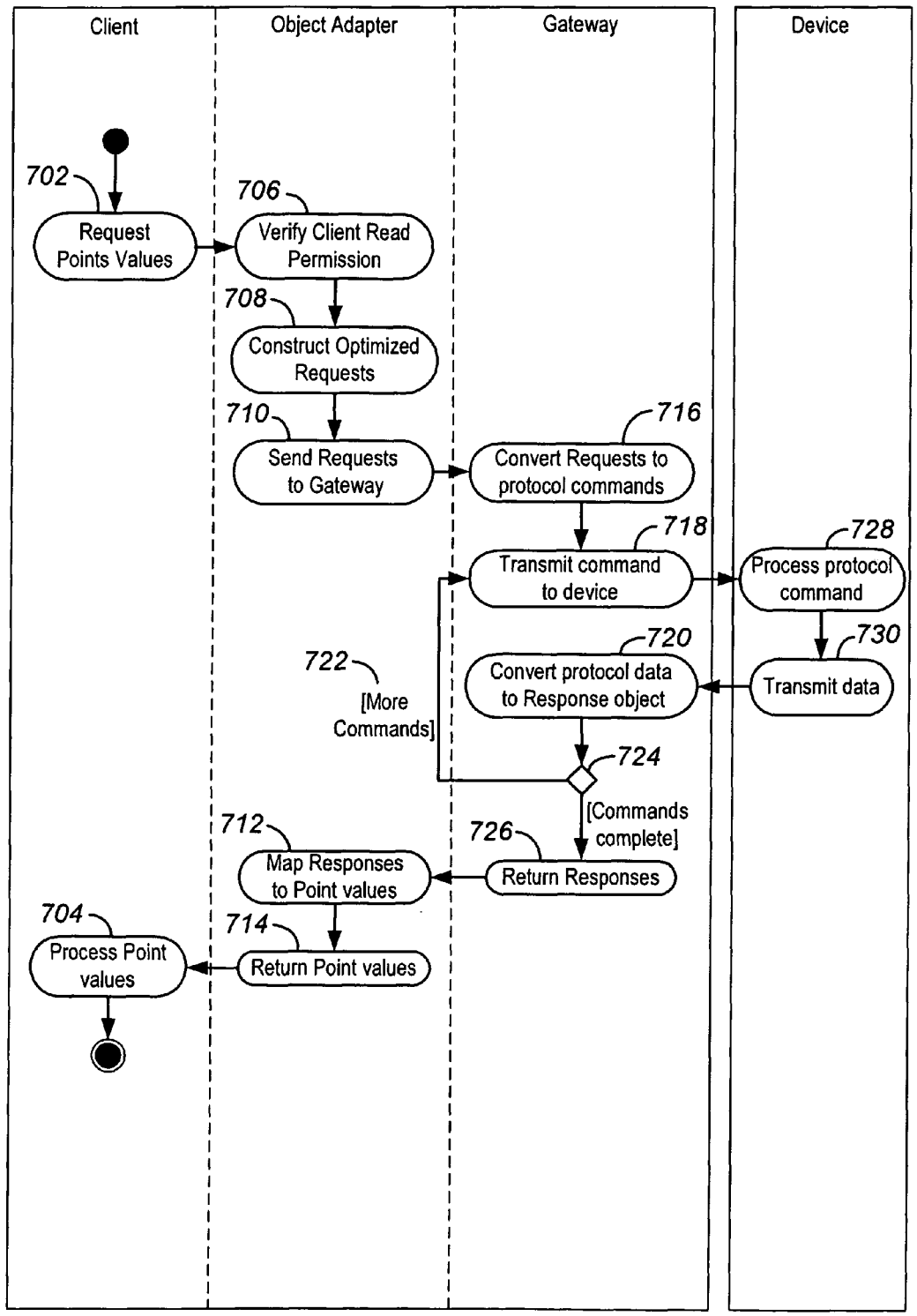
FIG. 2D is an exemplary flow chart of the data acquisition activity of the object adapter of FIG. 2.

FIG. 2D is an exemplary flow chart of the data acquisition activity of the object adapter of FIG. 2. This figure shows where the operations described in FIGS. 2A-B take place, and how the data operations of the client 272, object adapter 266, the gateway 264 and the device 262 can be related. For example, once a client 272 sends a request to get data from a device 272, the client can request point values and can process the point values 704 that have been received from the object adapter. The object adapter 266 can verify the client's read permission 706, can construct optimized requests 708, and can send requests to the gateway 710. In addition, the object adapter can map responses to point values 712 and can return point values 714. The gateway 264, can convert requests to protocol commands 716, can transmit commands to a device 718, can convert protocol data to a response object 720, can check for more commands 722 can determine if the commands are complete 724 and can return responses 726 to the object adapter. The device 262 can process protocol commands 728 and can transmit data 730.

FIG. 2C is an exemplary flow chart 600 of the poll activity of the object adapter of FIG. 2. This figure shows where the operations described in FIGS. 2A-B take place, and how the data operations of the client 272, object adapter 266, the gateway 264 and the device 262 can be related. For example, the client can request the polling of points 602, can wait for data 604, can continue polling and can processes point values 608. The object adapter 266 can verify a client read request 610, can construct optimized requests 612, can store the requests 614, and can send requests to the gateway 616. In addition, the object adapter 266, can map responses to point values, can return point values 620, or stop polling, and discard stored requests 630. The object adapter can also schedule the next poll 626 and can wait 628. The gateway 264, can convert requests to protocol commands 632, can transmit commands to a device 634, can convert protocol data to a response object 636, can check for more commands 638, can determine if the commands are complete 640 and can return responses 642 to the object adapter. The device 262 can process protocol commands 644 and can transmit data 646.

In one exemplary operation, the usage of the object adapter 210 may be described as follows. First, a client program or an end user requests Output Current, Output Power, and all digital attributes from one or more object adapters. For the purpose of this description, there are two object adapters in operation, a Modbus and a DF1 object adapter. Next, the Modbus object adapter maps this request into a request for 2 holding registers starting at register 4 and a separate request for 5 input status registers starting at register 1. Then, the Modbus object adapter sends both to the end device through the Modbus gateway. Also, the DF1 object adapter maps this request into one request for 4 bytes (2 16-bit values) starting at address 'I0:3,' and a separate request for one byte (8 singlebit values) starting at address 'I1:0.' Then, the DF1 object adapter sends both to the end device through the DF1 gateway. Next, gateways translate data structures containing requests into serial message packets and forward them to the end devices. Next, the gateways receive serial packets in response, parse them into data structures and assign time stamps based on transmission and reception times. Next, each object adapter receives two time-stamped responses from its gateway and maps values back to named attributes. Next, the Modbus object adapter reports to the client program that Output Current is 10, Output Power is 1100, UnitOnline is true, and all other digital points are false. Also, the DF1 object adapter reports that Output Current is 5, Output Power is 580, UnitOnline is true, and all other digital points are false.

ModBus Object Adapter

Figure 6:
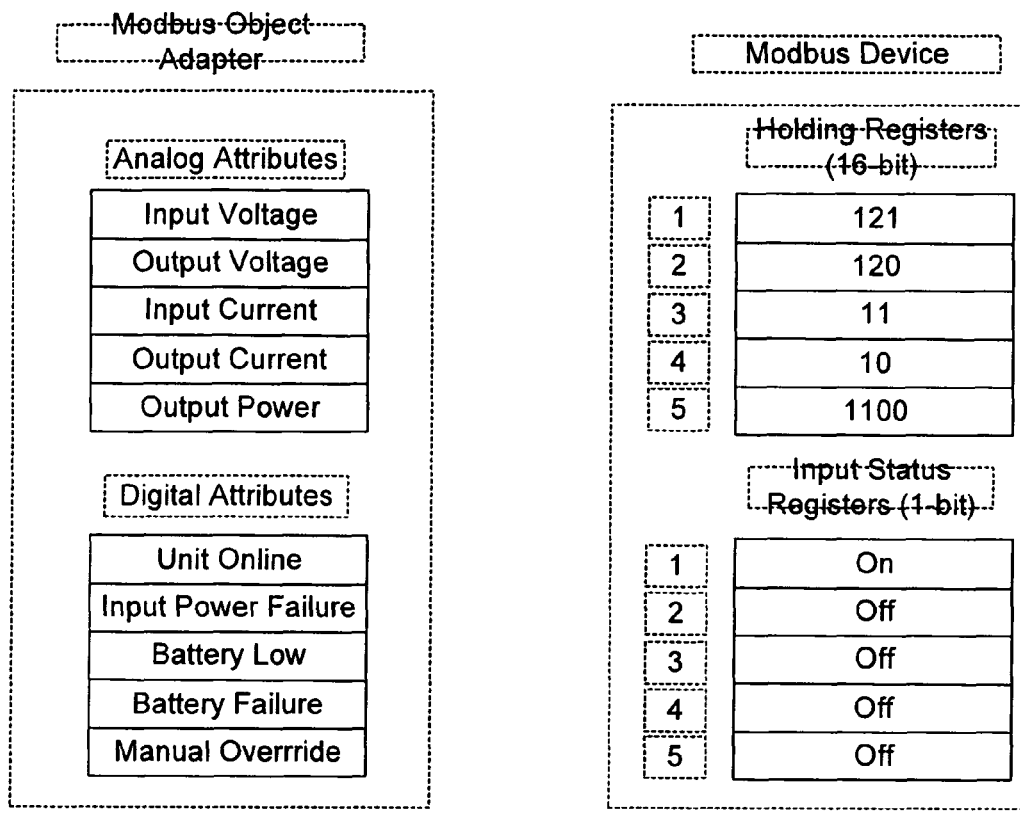
FIG. 6 is an exemplary diagram of one embodiment of the object adapter mapping corresponding to a Modbus device's registers.

The ModBus Object Adapter is an exemplary protocol object adapter for the ModBus protocol. A purpose of this specialization is identification of the actual communication protocol in use. This knowledge is needed for configuration purposes as the specifics of supplying attribute mapping data to a protocol object adapter may vary from protocol to protocol. FIG. 6 is an exemplary diagram of the object adapter mapping corresponding to a Modbus device's registers.

Allen Bradley DF1 Object Adapter

Figure 7:
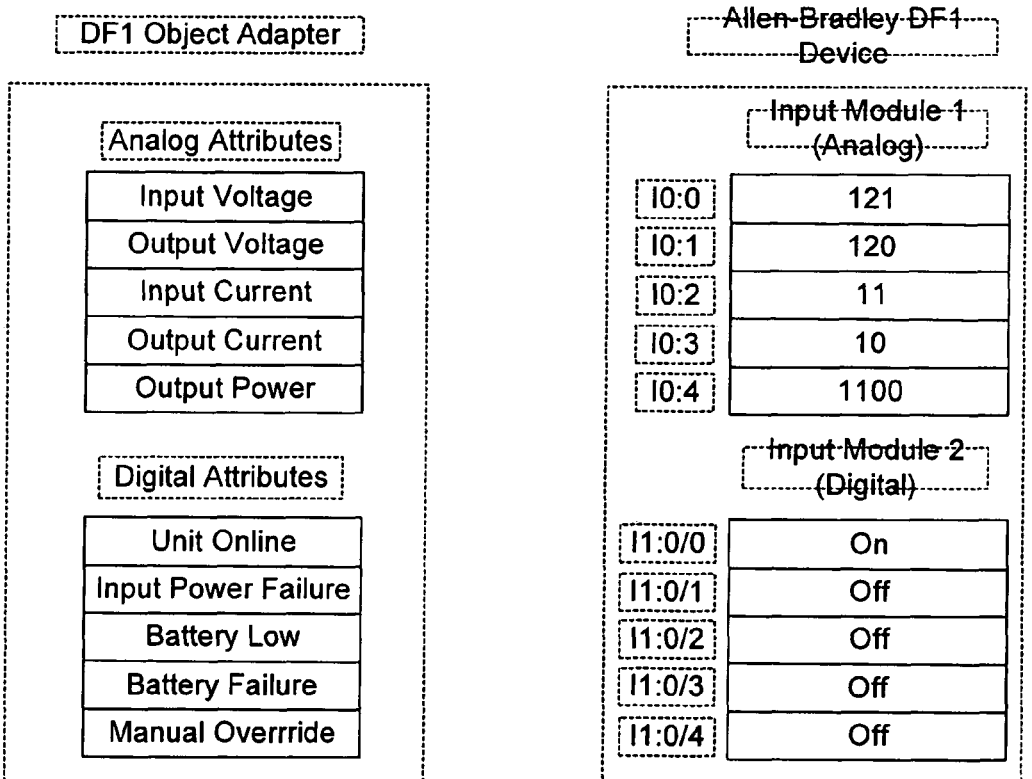
FIG. 7 is an exemplary diagram of another embodiment of the object adapter mapping corresponding to a DF1 device's data inputs/outputs.

The Allen Bradley DF1 object adapter is an exemplary protocol object adapter for the DF1 protocol. A purpose of this specialization is identification of the actual communication protocol in use; DF1 in this case. This knowledge is needed for configuration purposes as the specifics of supplying attribute mapping data to a protocol object adapter may vary from protocol to protocol. FIG. 7 is an exemplary diagram of the object adapter mapping corresponding to a DF1 device's data inputs/outputs.

Lookup Service

A lookup service operates as a centralized resource for distributed services to discover one another. The implementation of the lookup service is dependent on the networking technology chosen, such as a Jini lookup service, a message bus broker, or a Web Services Universal Description, Discovery, and Integration (UDDI) service.

The Lookup Service supports the federation of machines or programs into a single, dynamic distributed system. Devices participating in such a system can enter and leave at will, can tolerate network and system variability, and can offer services and resources to other devices and systems in the federation. As used herein, a service refers to an entity that can be used by a person, group of people, organization, program or other service. The service can be anything that can be offered by a computational, networked device, including access to a network, computation, storage, information, access to hardware (such as a printer, modem, etc.) or another user. Clients are able to discover and utilize the services provided by members of the federation.

Service Starter

The service starter is a utility for launching the application gateway services in a shared environment. Depending on the platform, this utility may be implemented as a remotely manageable network service or a more standard local application. In addition to the core components (protocol gateway, object adapter, and protocol bridge), the service starter is also responsible for launching any networking components used in exposing the core components, and optionally itself, as network services, such as a Jini exporter or a messaging module. The service starter can be configured to launch any combination of available services and components.

Figure 3:
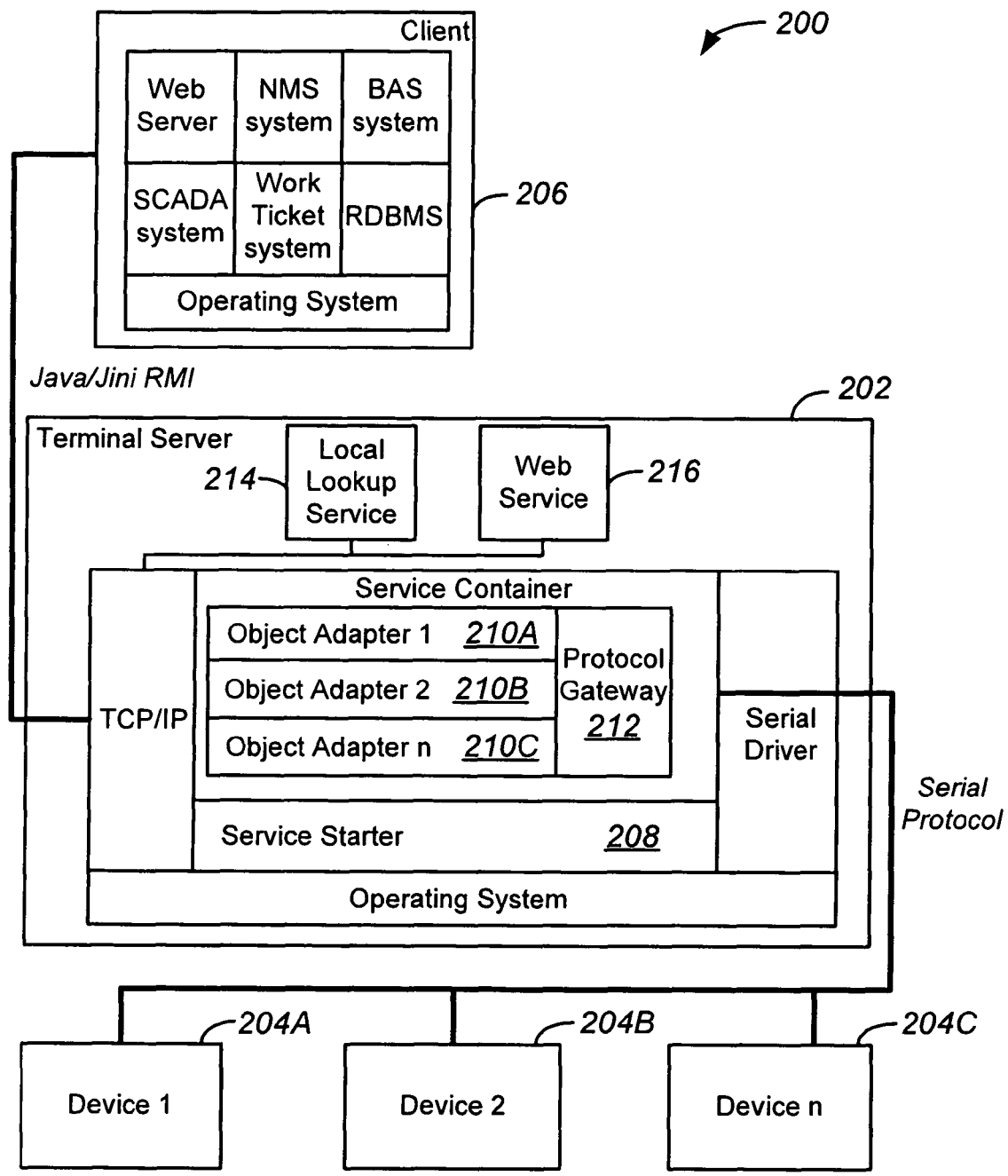
FIG. 3 is an exemplary block diagram of an alternative structure for the client components shown in FIG. 2.

FIG. 3 is an exemplary block diagram of an alternative structure for the client components shown in FIG. 2. As can be seen, the difference between FIGS. 2 and 3 is in the client application 206 that is communicating with the device or devices through the data collector module. Typically, as shown in FIG. 3, the client application can be any one or more of various monitoring or control systems, such as a Web server, a network management services ("NMS") system, a building automation system ("BAS") system, a Supervisory Control and Data Acquisition ("SCADA") system, a work ticket system, a Relational Database Management System ("RDBMS"), and so on.

Alternately, as shown in FIG. 2, the client application 206 that communicates with the one or more device(s) 204A-C through the data collector module 202, may be a building master management system (or other master management system) 250 that communicates via an optional protocol bridge module 252 with the data collector 202. The protocol bridge 252 can encompass both a set of software components and a hardware platform. The software components allow for interconnection of arbitrary devices utilizing a variety of communication protocols with a specific controls system. In one exemplary implementation, interconnection with the control system is accomplished via the N2 bus. Alternately, a BACnet bus may be used. Other equivalent bus architectures may be also used. The hardware platform supplies an appropriate physical and computing environment for the Protocol Bridge. The protocol bridge module 252 is used when the application programming interface ("API") is the preferred method the client software wants to communicate through. The table below enumerates one embodiment of the functional components of the protocol bridge platform. It should be noted that the standards used by each of the functions are exemplary ones and other equivalent implementations are also within the scope of the embodiments of the present invention.

| Function | Exemplary Relevant Standards |
| --- | --- |
| Network communication | IP, TCP and UDP transports, multicast |
| Network connection | Ethernet |
| User interface | Dynamic Web pages, Jini Service UI |
| Configuration | XML, Jini Configuration files. |
| Time synchronization | NTP |
| Serial communication | RS-232, RS-485 |
| Device metadata support | JMX, Jini Entry attributes |
| Synchronous device access | Message bus, RMI |
| Asynchronous data access | Message bus, RMI, Jini Remote Event |
| Service lookup and discovery | Message bus broker, Jini Lookup service |
| Security | Java Security (JAAS), JERI, SSL |
| Protocol handling | Protocol Gateway |
| Device abstraction | Protocol Object Adapter |
| Protocol bridge support | Protocol Bridge |

Functional Descriptions

Each of the functions listed above is described in greater detail in the following sections.

Network Communication

Network communication uses IP. Both TCP and UDP transports are used, often including UDP multicast as part of the discovery process. The following functions (and others) use the network communication services: lookup service; protocol handlers for IP based device protocol implementations; remote access to protocol object adapter; and protocol gateway and protocol bridge components (client use and configuration).

Network Connection

In one embodiment, the physical connection to the network may be a standard RJ45 that is capable of supporting at least 10/100 Mbit/s Ethernet.

User Interface

In one embodiment, human access to components may be presented to the user through dynamic HTML pages from a web server. When Jini networking is in use, the Jini ServiceUI framework may be used to export Java AWT or Swing components for use in a user interface.

Configuration

In one embodiment, static configuration of services is accomplished using configuration files such as Java property files and XML files. Security methods, various networking parameters and code locations, and custom metadata entries are supplied in this manner.

Dynamic configuration (or administration) of each service is accomplished via the administrable interface supplied by the service itself. In the case of protocol object adapter and protocol bridge services, XML configuration files are used in conjunction with the administrable interfaces.

Time Synchronization

Knowledge (or at least agreement) of the correct time is required for many applications. Network time protocol ("NTP") may be used to maintain time synchronization among components.

Serial Communication

Most protocol gateway services operate on protocols using serial transports. Support for RS232 via a DB-9 connection is supplied. Also, both two and four wire RS485 support is provided.

Device Metadata Support

An object adapter is, in essence, a protocol neutral abstraction of a single device and its points. The object adapter interface itself provides methods for accessing descriptive metadata about the device itself and its attributes. In addition, when the networking infrastructure supports metadata directly, such as JMX MBeanInfo or Jini Entry objects, the network interface layer translates the object adapter's metadata into the appropriate format.

Synchronous Device Access

Synchronous access to a device is provided by the following components, as described below. The protocol gateway provides synchronous access to a device via protocol specific requests. The one or more object adapter(s) provide synchronous access via assessors for each defined attribute. The protocol bridge objects provide synchronous access to a device according to the specific protocol supported. For example, the N2Bridge implementation responds to read and write requests by mapping the N2 device and object to a corresponding attribute of the protocol object adapter representing the end device.

Asynchronous Data Access

Asynchronous access to a device is provided by the following components, as described below.

The protocol gateway provides asynchronous query access to a device via protocol specific requests. For protocols that support asynchronous notifications originating at the end device, the Protocol Gateway is capable of propagating these notifications. The one or more object adapter(s) provide asynchronous query access by polling one or more attributes and notifying clients when the value changes. The protocol bridge objects provide asynchronous access to a device according to the specific protocol supported. For example, the N2Bridge implementation responds to poll requests with updated COS data by mapping the N2 device and object to a corresponding attribute of the Protocol Object Adapter representing the end device and polling these attributes.

Service Lookup and Discovery

In one implementation, the software component are implemented as Jini services and participate fully in the Jini Join and Discovery protocols through a Jini lookup service. In another implementation, the components are published using messages on a message bus. Clients and services locate one another by subscribing to the appropriate topic on the message bus and thereby receiving messages informing them of new services appearing on the network.

Security

Security is fully configurable for the data collector components. In one embodiment, the core components make use of the standard Java security APIs (Java Authentication and Authorization Service—JAAS) for establishing that the current client has permission to perform a requested operation, such as set the value of a writable attribute on an object adapter. In the distributed environment, the transmission of the credentials to establish a client's privileges is managed by the networking infrastructure. On a message bus, the message header can contain credential information such as a certificate from a public key infrastructure (PKI). In the Jini environment, the Jini Extensible Remote Invocation (JERI) layer provides support for passing PKI certificates, passwords, and Kerberos tickets. In addition to passing credential information, the networking layer can provide encryption of the traffic through such standard mechanisms as Secure Sockets Layer (SSL) or symmetric encryption algorithms such as Blowfish.

Operating Environment

In one implementation, the protocol bridge software is built using the Java programming language. The software may be deployed onto any platform capable of hosting a Java (e.g., JDK 1.3 (or later)) runtime environment. Specific requirements of acceptable Java environments are: JDK version 1.3 or later and javax.comm. support (Serial communication libraries). A Jini networking implementation also requires Java RMI support (remote method invocation for inter process communication). Any server based Java deployment or equivalent is suitable. In addition, J2ME (Java2 Micro Edition) deployment is also suitable.

Examples of platforms on which the protocol bridge software may be deployed include: x86/Windows 2000 Server, Professional and XP, and Modius TCS and TS series (PowerPC/MontaVista Linux/J9 JVM).

Having described the overall software functionality of the application gateway, various exemplary hardware deployment options are described below. Operationally, each application gateway, in accordance with the embodiments of the present invention, is able to interface with one, or more, pieces of infrastructure equipment. The infrastructure equipment may either host the application gateway as part of its operational processor as a software application, host the application gateway on a direct internal bus as a hardware application, or be coupled to an externally disposed application gateway by an external bus, such as a serial interface cable or other suitable communication interface bus. As will be described further below, the specific parameters of the physical serial, or other, interface may vary and will depend on the specific communication interface chosen for a particular piece of equipment by the equipment vendor or manufacturer. The interfaces most commonly provided by infrastructure equipment manufactures are serial interfaces such as RS-232, RS-422, RS-485, other interface busses such as CEbus, or might even be a contact closure harness if the infrastructure apparatus was not designed with the capability of supporting more sophisticated communication protocols.

Regardless of the nature of the communication interface between the application gateway and its supported equipment, the application gateway communicates with each apparatus using its vendor specified native language protocol, and is capable of interrogating each apparatus and receiving a set of monitoring variables in response. Such monitoring variables might be, for example, a measured temperature, a measured line voltage or current, a line pressure state for a leak detection system, and the like. Because the application gateway is able to communicate with each apparatus in its native language protocol, it need not engage in substantial translation activities.

In addition, when prompted to do so by the server, the gateway is able to pass appropriate control variables to its supported equipment, thereby commanding each apparatus to perform a particular function, such as setting a thermostat to a particular temperature, turning on (or off) an HVAC apparatus, raising (or lowering) ambient light levels, and the like. The rules, termed vendor specific control codes (or control codes), for managing any particular piece of facilities equipment, are resident in the application gateway and are used by the application gateway to monitor and control each of its supported pieces of apparatus. The choice of which particular control code to issue to a piece of supported equipment is determined by the system server and communicated to the application gateway over the application gateway's network link.

Figure 4:
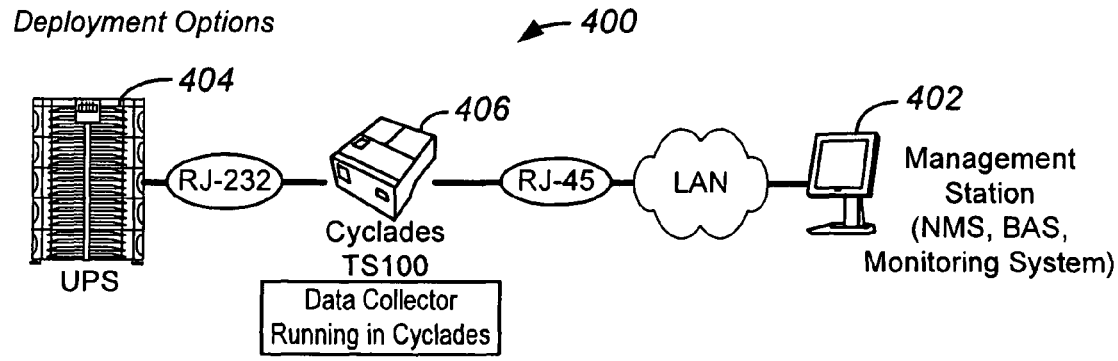
FIG. 4 is an exemplary block diagram of the data collector portion of the device application gateway architecture in accordance with one embodiment of the present invention running on a terminal server connected to an UPS communicating over a RS-232 serial connection.

FIG. 4 is an exemplary block diagram 400 of one embodiment of the data collector portion of the application gateway 406 running on a terminal server 402 connected to an Uninterruptible Power Supply ("UPS") 404 communicating over a RS-232 serial connection. The UPS data is sent over a RS-232 serial connection to the data collector device 406, which in turn communicates over a RJ-45 connection over a network (e.g., WAN, LAN, internet, wired or wireless) with a terminal server. The data collector device 406 virtualizes the UPS 404 and the exposes the UPS 404 as a network device on server 402, such that the proprietary data signals normally available from the devices is exposed in a generic manner for further processing by the management system.

Figure 5:
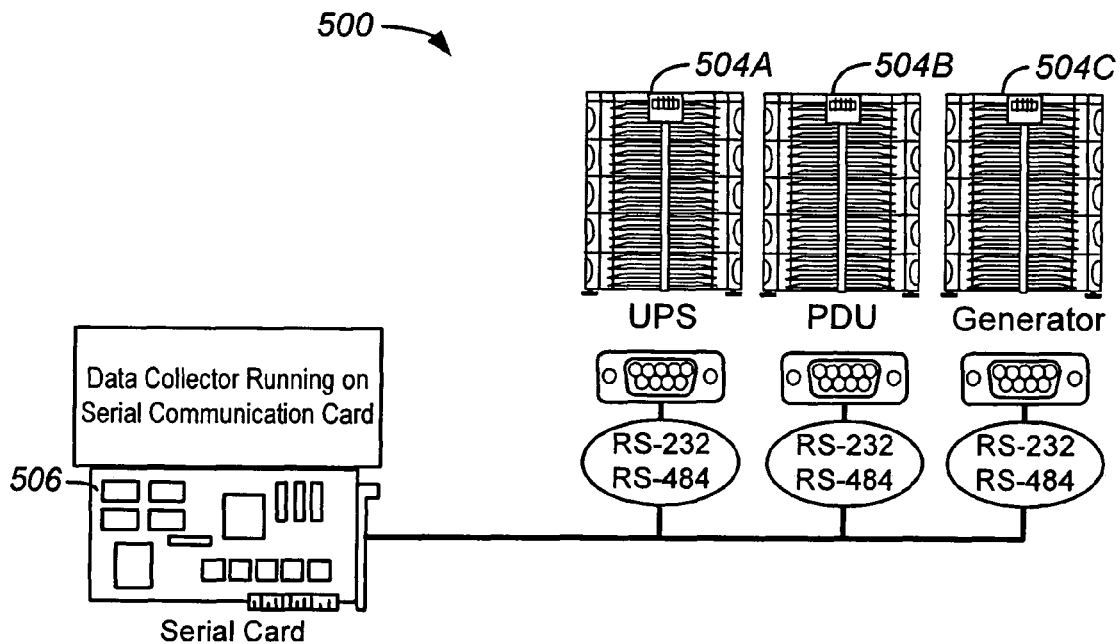
FIG. 5 is an exemplary block diagram of the data collector portion of the device application gateway architecture in accordance with one embodiment of the present invention running on a serial network card installed on a server connected to multiple power devices over serial communication interfaces.

FIG. 5 is an exemplary block diagram 500 of the data collector portion of the application gateway 506 running on a serial network card installed on a server connected to multiple power devices 504A-C over serial communication interfaces. In manner similar to that of FIG. 4, the proprietary data signals normally available from the devices are exposed in a generic manner for further processing by the management system.

As will be understood by those skilled in the art, other equivalent or alternative methods for the virtualization of a physical device and the exposing of the device as a network device on a server according to the embodiments of the present invention can be envisioned without departing from the essential characteristics thereof. Accordingly, the foregoing disclosure is intended to be illustrative, but not limiting, of the scope of the invention which is set forth in the following claims.

What is claimed is:

1. A method comprising:
    coupling an application gateway to a physical device and a network, said application gateway having a non-transitory memory for storage of program instructions,
    said physical device being disposed to be controlled by said application gateway, said physical device including at least one register including register information manipulable by said application gateway, wherein manipulation of said register information controls said physical device;
    receiving at the application gateway, at least correlation information between the physical device and said at least one register, wherein synchronous communications with the network are mapped to asynchronous communications with the physical device, and
    controlling the physical device by manipulating the register information using synchronous type communication between two network-connected systems to exchange messages between the physical device and a server coupled to the application gateway;
    receiving command information from the physical device;
    translating relevant command information into register operations,
    wherein the command information includes asynchronous operations not part of the native interface command of the physical device.

2. The method of claim 1 further including:
    receiving command information for the device;
    transmitting register information in response to that command information.

3. The method of claim 2 further including:
    altering the register information before transmitting, said altering in response to instructions in the correlation information.

4. The method of claim 1 wherein
    the correlation information is en-coded in extensive markup language (XML).

5. A system comprising:
    a physical device coupled to an application gateway, said physical device controlled by asynchronous commands,
    said physical device being disposed to be controlled by said application gateway, said physical device including at least one register including register information manipulable by said application gateway, wherein manipulation of said register information controls said physical device;
    a server coupled to the application gateway;
    said application gateway operable to receive information comprising at least correlation information between the physical device and said at least one register, wherein synchronous type communication between two network-connected systems to exchange messages between the physical device and a server coupled to the application gateway;
    receiving command information from the physical device;
    translating relevant command information into register operations,
    wherein the command information includes asynchronous operations not part of the native interface command of the physical device.

6. The system of claim 5 wherein
the attribution information is an extensive markup language (XML) file.

7. The system of claim 5 wherein controls the physical device includes either reading from or writing to the register.

8. A device comprising:
    a processor coupled to a network, said processor coupled to a non-transitory memory for storage of program instructions;
    a port coupled to the processor, said port operable for connecting to at least one analog signal,
    wherein said analog signal is disposed to be coupled to at least one register at a physical device, said register being manipulable by said processor;
    said processor having instruction code operable to
        receive information comprising at least correlation information between the port and the network;
        map the port to a register, and
        read from or write to the register to acquire and aggregate data from the physical device using synchronous type communication between two network-connected systems to exchange messages between the physical device and a server coupled to the application gateway;
    wherein the analog signal is asynchronously controlled;
    wherein asynchronous control of said analog signal effects control of said physical device;
    receiving command information from the physical device;
    translating relevant command information into register operations,
    wherein the command information includes asynchronous operations not part of the native interface command of the physical device.

9. The device of claim 8 wherein
the instruction code further includes instructions for:
controlling a physical device coupled to the port using commands that are not native to the physical device.

10. The device of claim 8 wherein
the information is an extensive markup language (XML) file.

* * * * *